UNITED STATES PATENT OFFICE.

GEORGE WALKER, OF NEW YORK, N. Y.

PYROXYLIN COMPOSITION.

SPECIFICATION forming part of Letters Patent No. 604,181, dated May 17, 1898.

Application filed September 5, 1895. Serial No. 561,495. (No specimens.)

*To all whom it may concern:*

Be it known that I, GEORGE WALKER, of the city and county of New York, in the State of New York, have invented a new and useful Improvement in Pyroxylin Compositions, of which the following is a specification.

This invention is based upon my discovery of the solubility of pyroxylin in those oils lighter than water which are obtained by the distillation of the tar of the hard woods; and my invention consists in a composition of pyroxylin and such an oil.

This new composition is, according to the proportions of pyroxylin and oil which it contains, suitable for many purposes—as, for instance, when the proportions are such as to render it sufficiently fluid it makes a good varnish for the protection and finish of various articles and bodies, or with a sufficiently large proportion of pyroxylin it may be made suitable to be manufactured into combs, billiard-balls, and other articles, such as are commonly made or have been made of celluloid.

By the term "hard woods" I mean the woods of the leaf-trees—beech, birch, maple, and oak, for example—as distinguished from the needle-trees, such as pine. When the tar of these woods is distilled in a suitable apparatus until one-half of its weight of the tar has been distilled at a temperature from 100° to 250° centigrade, the first half of the distillate will consist of pyroligneous acid containing methylic alcohol and an oil lighter than water, together with some oil heavier than water which has been carried over mechanically with the watery vapor. This mixture of light oil and pyroligneous acid is separated by settlement and decantation and the acid and a certain portion of creosote which it contains are completely removed from the separated light oil by agitation with caustic alkali, after which the said oil is resubmitted to distillation at a temperature ranging from 100° to 170° centigrade, a residue consisting of the oil heavier than water remaining in the still. The distillate so obtained consists of a mixture of oils having boiling-points from 65° to 170° centigrade and specific gravities from .860 to .910, the mixture constituting the material claimed by me as a solvent for pyroxylin. Such a mixture is the oil which I generally use in my composition, though any fraction of such mixture would be within the scope of my invention.

When the composition is to be used as a varnish, the proportion of pyroxylin to the oil may be from three to ten per cent., by weight, preferably about five per cent.

For a plastic composition to be molded into combs, balls, and other articles abouty forty to sixty per cent., by weight, of pyroxylin may be used.

I make the composition by macerating and stirring the ingredients together, generally at ordinary atmospheric temperature, though a gentle heat might be applied during the process.

The tar of hard woods above referred to is obtained from the body of the tree or from both body and bark, as distinguished from the bark alone.

In using the expression "having boiling-points from 65° to 170° centigrade" I wish to be understood as referring to a product which will vaporize at temperatures within the limits named, and in using the expression "decreosoted" in the claim I do not intend to confine myself strictly to a product which has no trace of creosote therein, but to a product from which the creosote has been completely removed, or removed as far as may be in the course of practical manufacture, the object being to save the creosote as a separate product and utilize a portion of the remaining oil as a solvent of pyroxylin.

What I claim as my invention is—

The herein-described composition consisting of pyroxylin and the decreosoted oil of the tar of hard woods having a boiling-point from 65.° to 170° centigrade and a specific gravity of about .860 to .910.

GEORGE WALKER.

Witnesses:
HENRY T. BROWN,
LIDA M. EGBERT.